(12) United States Patent
Cha et al.

(10) Patent No.: US 11,223,762 B2
(45) Date of Patent: Jan. 11, 2022

(54) DEVICE AND METHOD FOR PROCESSING HIGH-RESOLUTION IMAGE

(71) Applicant: Samsung Electronics Co., Ltd., Suwon-si (KR)

(72) Inventors: Kilhyung Cha, Seoul (KR); Dongwoo Lee, Yongin-si (KR); Serhoon Lee, Yongin-si (KR); Kyungah Jeong, Seoul (KR); Sungjin Huh, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/060,761

(22) Filed: Oct. 1, 2020

(65) Prior Publication Data

US 2021/0176396 A1    Jun. 10, 2021

(30) Foreign Application Priority Data

Dec. 6, 2019    (KR) .................. 10-2019-0161678
Mar. 11, 2020    (KR) .................. 10-2020-0030381

(51) Int. Cl.
*H04N 5/232* (2006.01)

(52) U.S. Cl.
CPC ..... *H04N 5/23232* (2013.01); *H04N 5/23245* (2013.01)

(58) Field of Classification Search
CPC ................. H04N 5/23232; H04N 5/23245
See application file for complete search history.

(56) References Cited

U.S. PATENT DOCUMENTS

| | | | |
|---|---|---|---|
| 6,839,452 B1 * | 1/2005 | Yang | ..................... H03F 3/082 |
| | | | 348/E3.02 |
| 7,705,889 B2 | 4/2010 | Tabatabai et al. | |
| 8,681,236 B2 | 3/2014 | Baek | |
| 8,872,931 B2 | 10/2014 | Roh et al. | |
| 9,124,785 B2 | 9/2015 | Choi et al. | |
| 9,225,904 B2 | 12/2015 | Furuya et al. | |
| 9,232,125 B2 | 1/2016 | Song | |
| 9,300,868 B2 | 3/2016 | Baek et al. | |
| 9,313,378 B2 | 4/2016 | Lee et al. | |
| 9,716,830 B2 | 7/2017 | Baek | |
| 2008/0136942 A1 | 6/2008 | Yoon et al. | |

(Continued)

FOREIGN PATENT DOCUMENTS

KR    101087550 B1    11/2011

*Primary Examiner* — Timothy J Henn
(74) *Attorney, Agent, or Firm* — Muir Patent Law, PLLC

(57) ABSTRACT

A device includes an image sensor configured to generate a first signal corresponding to an image having a first resolution in a first mode, a second signal corresponding to an image having a second resolution higher than the first resolution in a second mode. The image sensor is configured to generate frame information regarding a resolution, the first mode and the second mode respectively determined based on a mode signal. The device further includes a channel allocator configured to allocate the first signal and the second signal to different channels, of a plurality of channels, based on the frame information; and an image signal processor (ISP) comprising the plurality of channels, a first channel configured to process the first signal and a second channel configured to process the second signal. The ISP is configured to post-process image data processed by the plurality of channels.

20 Claims, 12 Drawing Sheets

(56) References Cited

U.S. PATENT DOCUMENTS

| | | | |
|---|---|---|---|
| 2009/0195842 A1* | 8/2009 | Sasaki | H04N 1/031 358/474 |
| 2011/0261228 A1 | 10/2011 | Peng et al. | |
| 2013/0021505 A1* | 1/2013 | Plowman | H04N 5/23232 348/241 |
| 2013/0258136 A1 | 10/2013 | Lee | |
| 2013/0329088 A1* | 12/2013 | Blayvas | H04N 5/232133 348/239 |
| 2014/0078343 A1* | 3/2014 | Dai | H04N 5/23229 348/231.99 |

* cited by examiner

DEVICE AND METHOD FOR PROCESSING HIGH-RESOLUTION IMAGE

CROSS-REFERENCE TO RELATED APPLICATIONS

This application claims the benefit of priority from Korean Patent Application Nos. 10-2019-0161678 and 10-2020-0030381, filed on Dec. 6, 2019 and Mar. 11, 2020, respectively, in the Korean Intellectual Property Office, the disclosures of which are incorporated herein in their entireties by reference.

BACKGROUND

The inventive concept relates to image processing, and more particularly, to a device and method for processing a high-resolution image.

As the number of cameras mounted on devices increases or the number of images that may be captured per second increases, the image processing capability of the device may be required to be increased. Accordingly, it may be required to efficiently solve various problems caused by limitations of image processing capabilities, such as frame drop and shutter lag.

SUMMARY

The inventive concept provides a device capable of determining that a photographing mode for preview or capture is changed in a frame unit and allocating an appropriate channel according to resolution.

According to an aspect of the inventive concept, there is provided a device including an image sensor configured to generate a first signal corresponding to an image having a first resolution in a first mode, a second signal corresponding to an image having a second resolution higher than the first resolution in a second mode, and generate frame information regarding a resolution, the first mode and the second mode respectively determined based on a mode signal; a channel allocator configured to allocate the first signal and the second signal to different channels, of a plurality of channels, based on the frame information; and an image signal processor (ISP) comprising the plurality of channels, a first channel of the plurality of channels configured to process the first signal and a second channel of the plurality of channels configured to process the second signal, and wherein the ISP is configured to post-process image data processed by the plurality of channels.

According to another aspect of the inventive concept, there is provided a device including an image sensor configured to generate a first signal corresponding to an image having a first resolution in a first mode, a second signal corresponding to an image having a second resolution higher than the first resolution in a second mode, and generate frame information regarding a resolution, the first mode and the second mode respectively determined based on a mode signal; a channel allocator configured to allocate the first signal and the second signal to different channels, of a plurality of channels, based on the frame information; an image signal processor (ISP) comprising the plurality of channels, a first channel of the plurality of channels configured to process the first image and a second channel of the plurality of channels configured to process the second image, and configured to generate a third signal as a result of post-processing the first signal, and generate a fourth signal as a result of post-processing the second signal; a memory subsystem including a first memory in which the third signal is temporarily stored and a second memory in which the fourth signal is temporarily stored; a controller configured to generate the mode signal and apply the mode signal corresponding to the second mode to the image sensor in response to a capture command; a display unit configured to load and display at least one of the third signal and the fourth signal for a user to preview the image having the first resolution in advance; and a capture unit configured to load the fourth signal based on the capture command to generate the image having the second resolution.

According to another aspect of the inventive concept, there is provided an image processing method including generating a first signal corresponding to an image having a first resolution in a first mode; generating a second signal corresponding to an image having a second resolution higher than the first resolution in a second mode; generating frame information in the form of a virtual channel ID based on a predetermined channel standard; and determining a resolution of an image frame based on the frame information and allocating the first signal and the second signal to different channels based on the determined resolution.

BRIEF DESCRIPTION OF THE DRAWINGS

Embodiments of the inventive concept will be more clearly understood from the following detailed description taken in conjunction with the accompanying drawings in which.

DETAILED DESCRIPTION OF THE EMBODIMENTS

Hereinafter, embodiments of the inventive concept will be described with reference to the accompanying drawings.

Figure 1:
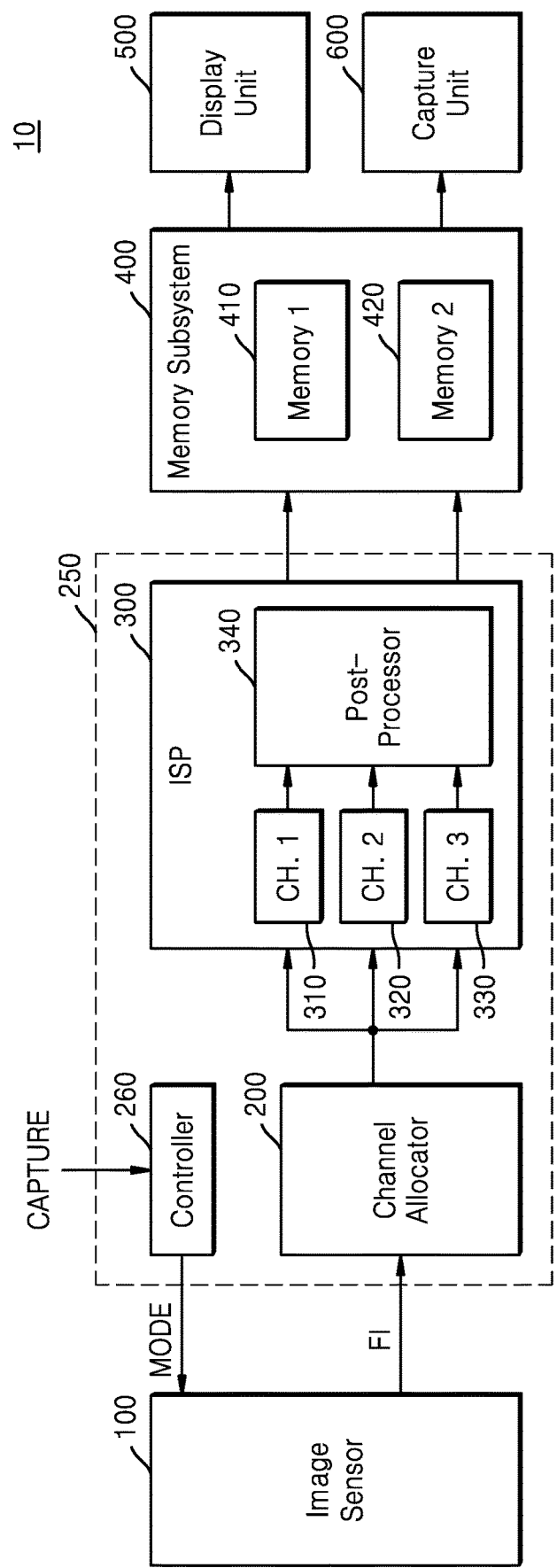
FIG. 1 is a block diagram illustrating a device according to embodiments of the inventive concept.

FIG. 1 is a block diagram illustrating a device 10 according to embodiments of the inventive concept.

Referring to FIG. 1, the device 10 is capable of capturing and/or storing an image of an object using a solid-state image sensor such as a charge-coupled device and a complementary metal oxide semiconductor (CMOS) and may be implemented in a digital camera, a digital camcorder, a mobile phone, or a tablet computer, or any other portable device. The portable device may include a laptop computer, a mobile phone, a smart phone, a tablet PC, a personal digital assistant (PDA), an enterprise digital assistant (EDA), a digital still camera, a digital video camera, an audio device, a portable multimedia player (PMP), a personal navigation device (PND), an MP3 player, a handheld game console, an e-book, a wearable device, and the like. In addition, the device 10 may be mounted on an electronic device such as a drone, an advanced driver assistance system (ADAS), etc., or an electronic device provided as parts for a vehicle, furniture, manufacturing facilities, doors, various measuring devices, etc.

The device 10 according to the inventive concept may capture an image of a subject (or an object) for each frame. Based on a mode signal MODE generated according to a user's capture command CAPTURE, the device 10 senses a low-resolution image or a high-resolution image. Frame information FI may be generated to distinguish a low-resolution image frame from a high-resolution image frame among sensed image frames. The generated frame information FI may be included in channel information according to a standardized channel standard or an arbitrary channel standard determined by a product producer group. For example, the channel information may be stored in a header of a transmitted signal, and may be transmitted to another intellectual property (IP) through a virtual channel without using additional data storage space. The arbitrary channel standard determined by the product producer group may be a Mobile Industry Processor Interface (MIPI) Alliance in which mobile device manufacturers have established a common interface specification, but is not limited thereto and various arbitrary channel standards may apply. In addition, the channel information may be transmitted to another IP in the form of embedded data in which the frame information FI is stored in an embedded chip other than the virtual channel.

The device 10 according to the inventive concept may read the channel information from the frame information FI to determine the resolution of the captured image frame. Based on the frame information FI, when it is determined that the current image frame is a low-resolution image frame, the device 10 may allocate a signal in regard to the low-resolution image frame to a low-resolution channel with optimized environment configurations to process the low-resolution image frame. When it is determined that a received next image frame is a high-resolution image frame, the device 10 may allocate a signal in regard to the high-resolution image frame to a high-resolution channel with optimized environment configurations to process the high-resolution image frame. That is, the device 10 may set a path such that the high-resolution image frame and the low-resolution image frame pass through different channels. That is, the device 10 may dynamically allocate the high-resolution image frame and the low-resolution image frame according to resolution.

The device 10 according to the inventive concept may post-process the high-resolution image frame and the low-resolution image frame input through different channels using one processor. That is, although the device 10 uses one processor, the device 10 processes image frames input through channels with different environment configurations and thereby does not require the use of multiple processors.

The device 10 according to embodiments of the inventive concept may temporarily store the post-processed low-resolution image frame, and then display the low-resolution image frame on a preview screen such that the user may preview the captured subject (or object). Because the low-resolution image frame has fewer pixels and less data processing than the high-resolution image frame, the low-resolution image frame may be quickly displayed on the preview screen. After temporarily storing the post-processed high-resolution image frame, the device 10 may capture the object in high-resolution in response to the user's capture command CAPTURE. The device 10 uses a channel with an environment configuration to rapidly process the high-resolution image frame, and thus, the device 10 may quickly capture an object without delay or frame loss even when the resolution changes from the low-resolution image frame to the high-resolution image frame. In addition, the device 10 may perform scaling on the post-processed high-resolution image frame to generate a low-resolution image, thereby displaying the processed image on the preview screen (of a display).

Referring to FIG. 1, the device 10 according to an embodiment of the inventive concept may include an image sensor 100 and an image processor 250 including a channel allocator 200, a controller 260, and an image signal processor (ISP) 300.

The image sensor 100 may convert an optical signal of a subject (or an object) incident through an optical lens into an electrical signal, generate image data for each frame based on electrical signals, and output the generated image data to the image processor 250. The image sensor 100 may be mounted on an electronic device having an image or light sensing function. For example, the image sensor 100 may be mounted on an electronic device such as a camera, a smart phone, a wearable device, an Internet of Things (IoT) device, a tablet personal computer (PC), a PDA, a PMP, a navigation system, a drone, an ADAS, etc. In addition, the image sensor 100 may be mounted on an electronic device provided as parts in a vehicle, furniture, manufacturing facilities, doors, various measuring devices, and the like. The image sensor 100 may sense an object or subject (i.e., capture the light (i.e., optical signal) required to form a digital image of an object or subject) through a lens under the control of the ISP 300 or the image processor 250.

The image sensor 100 may include a plurality of elements that process the received optical signal for each frame. The plurality of elements may include additional components for processing an optical signal or for improving image sensing sensitivity, such as a pixel array, a row driver, a ramp signal generator, a timing generator, an analog-to-digital converter and a readout circuit including an output buffer. Each of a plurality of pixels may include a photo sensing element that senses light and converts the sensed light into a pixel signal that is an electrical signal. For example, the photo sensing element may be a photodiode, a photo transistor, a photo gate, a pinned photodiode (PPD), or a combination thereof. Each of a plurality of photo sensing elements may have a 4-transistor structure including a photodiode, a transfer transistor, a reset transistor, an amplification transistor, and a selection transistor. According to an embodiment, each of the plurality of photo sensing elements may have a 1-transistor structure, a 3-transistor structure, or a 5-transistor structure, or a structure in which the plurality of pixels share some transistors.

In processing an incident subject (or object) for each frame, the image sensor 100 may sense the incident object by varying the resolution based on a mode signal MODE received from the image processor 250. According to an embodiment of the inventive concept, the image sensor 100 may set a photographing mode to a low-resolution mode as a default mode, thereby generating a low-resolution pixel signal. The mode signal MODE may be generated based on a capture command CAPTURE generated by a user. When the image sensor 100 receives the mode signal MODE based on the capture command CAPTURE from the user or the mode signal MODE in response to a photographing mode change command (e.g., change to a high-resolution mode), the image sensor 100 may change the photographing mode from the previous low-resolution mode to the high-resolution mode to sense the image frame of the object with high sensitivity, thereby generating a high-resolution pixel signal. In other words, the image sensor 100 may process the image of the object for each frame, and each frame may have a different resolution. Here, for convenience of description, resolutions sensed by the image sensor 100 are two resolutions of low-resolution and high-resolution, but are not limited thereto and various levels of resolution may be sensed. If necessary, the resolution may be sensed with low-resolution, medium resolution, or high-resolution, or may include N levels of resolution (N is an integer greater than 1).

The image sensor 100 according to the inventive concept may generate the frame information FI in accordance with a standardized channel standard or an arbitrary channel standard determined by a product producer group to distinguish whether the sensed image frame has low-resolution or high-resolution. The generated frame information FI may be transmitted to the image processor 250. The channel information including the frame information FI may be included in a header region of a signal transmitted to the image processor 250. In addition, the channel information may be transmitted to another IP in the form of embedded data in which the frame information FI is stored in an embedded chip other than the virtual channel.

According to some embodiments, the image sensor 100 may be formed integrally on the same chip with other digital logic such as the ISP 300, a scaler (not shown), the post-processor 250, etc. As illustrated in FIG. 1, the image processor 250 may include the channel allocator 200, the controller 260, and the ISP 300, and the ISP 300 may further include a first channel 310, a second channel 320, and a third channel 330 and the post-processor 340. The image processor 250 may include and/or be a central processing unit (CPU), a microprocessor, or a microcontroller unit (MCU). Post-processing may be performed directly by the image processor 250 or performed by the ISP 300 included in the image processor 250. Post-processing may be executed through the application of an image enhancement algorithm to image artifacts. Here, post-processing may mean a series of subsequent processing operations to reduce errors and distortions based on the sensed image data. For example, the post-processing may include image processing to change the data format of the image data (for example, change the image data of a Bayer pattern to a YUV or RGB format), image processing for improving image quality such as noise reduction, brightness adjustment, sharpness adjustment, white balancing, denoising, demosaicking, lens shading, gamma correction, etc. on the received image frame.

The channel allocator 200 may receive image data which is an output signal of the output buffer of the image sensor 100, and set a path such that different image frames having different resolutions pass through different channels based on the image data. According to an embodiment of the inventive concept, the channel allocator 200 may read the frame information FI based on the received signal and determine the resolution of the received current image frame. When the determined image frame has low resolution, the channel allocator 200 may transmit the image frame to a channel with an optimized environment configuration to process the low-resolution image frame. When the determined image frame has high resolution, the channel allocator 200 may transmit the image frame to a channel with an optimized environment configuration to process the high-resolution image frame.

The channel allocator 200 may read channel information and determine which frame has high resolution and which frame has low resolution among the plurality of frames output from the image sensor 100. In other words, the channel allocator 200 may determine from which frame of a series of frames that are continuously processed is the high-resolution image frame, and allocate channels such that high-resolution image frames pass through different channels than the low-resolution frames.

The controller 260 may generate the mode signal MODE capable of setting the photographing mode of the image sensor 100 to the high-resolution mode or the low-resolution mode. The controller 260 may receive the capture command CAPTURE from the user. The controller 260 may generate the mode signal MODE based on the received capture command CAPTURE, or may generate the mode signal MODE in advance based on information that the capture command CAPTURE will be issued soon. The information that the capture command CAPTURE will be issued soon may be learned in advance or received from a user who has performed an operation such as half-shutter (e.g., half-pressing a shutter actuator). In FIG. 1, the controller 260 is configured separately from the ISP 300 and configured inside the image processor 250, but is not limited thereto.

Referring to FIG. 1, a first channel 310 to a third channel 330 of the ISP 300 may be configured to process image frames of different resolutions, respectively. That is, the channel allocator 200 may determine the frame information FI from the received signal, and set the path such that signals corresponding to the high-resolution image frame and the low-resolution image frame pass through different channels. In other words, the channel allocator 200 may dynamically allocate the high-resolution image frame and the low-resolution image frame to different channels according to resolution. The specific configuration of the channel allocator 200 will be described with respect to FIG. 2.

The ISP 300 may process/treat an image such that a person may see the image well, and output the processed/treated image to a memory subsystem 400 or directly to a display unit 500. Alternatively, the ISP 300 may receive a control signal from an external host through a PC interface (I/F), and provide the processed/treated image to the external host.

The ISP 300 according to the inventive concept may receive image frames through the first channel 310 to the third channel 330. The first channel 310 to the third channel 330 may be set to an environment optimized for processing the image frames according to resolution. For example, the first channel 310 may have an environment configuration optimized for processing the low-resolution image frame, the third channel 330 may have an environment configuration optimized for processing the high-resolution image frame, and the second channel 320 may have an environment configuration optimized for processing the medium resolution image frame having a higher resolution than the low-resolution image frame and a lower resolution than the high-resolution image frame. Three channels, that is, the first channel 310 to the third channel 330, are shown in FIG. 1, but are not limited thereto, and there may be a plurality of channels. In other words, by the need to make the processing speed or power consumption different according to the resolution of the image data, in response to a plurality of resolution levels sensed by the image sensor 100, the ISP 300 may have a plurality of channels each having a preset environment configuration. Also, by the need to make the processing algorithms, speed, or power consumption different due to other reasons than the resolution of the image data, in correspondence to a plurality of operation modes sensed by the image sensor 100, the ISP 300 may have a plurality of channels each having a preset environment configurations.

The ISP 300 according to the inventive concept may be a multi-image signal processor capable of processing multiple sensor outputs. The multi-image signal processor may include a plurality of channels for simultaneously processing image data output from multiple sensors, or may include a pipeline designed internal processor capable of sequentially processing multiple input signals to efficiently process a plurality of pieces of image data.

The ISP 300 may include the first to third channels 310, 320, and 330 and the post-processor 340 to configure hardware of the device 10. In addition, the ISP 300 processes a plurality of channels by using a single post-processor, for example, the post-processor 340, and thereby does not require the use of a plurality of processors. Because the ISP 300 has the effect of performing the functionality of a plurality of processors (i.e., cores) with only one processor chip (e.g., a core), the space occupied by hardware may be reduced, and additionally, the cost of mounting the processor chip may also be saved. In FIG. 1, the ISP 300 is configured separately from the image sensor 100, but is not limited thereto.

In an embodiment, the ISP 300 and the channel allocator 200 may be located inside the image sensor 100 and the ISP 300 may output the processed/treated image to a memory subsystem 400 or directly to a display unit 500. In addition, in an embodiment in which the ISP 300 and channel allocator 200 are located inside the image sensor, the image processor 250 may alternatively perform, using one or more processors, post-processing other than the post-processing performed by the ISP 300.

The device 10 according to an embodiment of the inventive concept may further include the memory subsystem 400, the display unit 500, and a capture unit 600. The memory subsystem 400 may include a first memory 410 and a second memory 420.

The memory subsystem 400 may store the post-processed image data received from the ISP 300 and provide the stored data to other components of the device 10. In addition, the memory subsystem 400 may store various system or user data necessary for operating the device 10. For example, the memory subsystem 400 may include a nonvolatile memory that stores various types of information in a nonvolatile way, and a volatile memory that loads information such as firmware in connection with the operation of the device 10.

The memory subsystem 400 according to an embodiment of the inventive concept may temporarily store the image data corresponding to the low-resolution image frame among the image data received from the ISP 300 or the low-resolution image data generated based on the high-resolution image frame in a first memory 410. The device 10 may load all the low-resolution image frames temporarily stored in the first memory 410 to output the low-resolution image frames to the display unit 500, thereby seamlessly displaying a captured image. The memory subsystem 400 may temporarily store image data corresponding to a high-resolution image frame among image data received from the ISP 300 in the second memory 420. The device 10 may load a high-resolution image frame corresponding to a capture command CAPTURE time from the second memory 420 according to the user's capture command CAPTURE or a processing command of the image processor 250 to output the high-resolution image frame to the capture unit 600, thereby controlling the capture unit 600 to generate a high-resolution image.

Because the first memory 410 stores the low-resolution image frame, the storage capacity of the first memory 410 may be relatively less than that of the second memory 420 that stores the high-resolution image frame. However, the first memory 410 may have a relatively larger storage capacity than the second memory 420 according to the number of temporarily stored image frames. Alternatively, while the first memory 410 and the second memory 420 may have the same storage capacity, the amount of data stored under the control of the device 10 may be dynamically adjusted.

The memory subsystem 400 may be implemented as volatile memory or nonvolatile memory. The volatile memory may include Dynamic Random Access Memory DRAM, Static RAM (SRAM), etc. and the nonvolatile memory may include Read Only Memory (ROM), Programmable ROM (PROM), Electrically Programmable ROM (EPROM), Electrically Erasable and Programmable ROM (EEPROM( ) Flash memory, Phase-change RAM (PRAM), Magnetic RAM (MRAM), Resistive RAM (RRAM), Ferroelectric RAM (FRAM), etc.

The display unit 500 according to an embodiment of the inventive concept may continuously load the image frame temporarily stored in the memory subsystem 400 to provide a preview screen for the user to capture an object. For example, the display unit 500 may load the low-resolution image data from the first memory 410 in which the post-processed low-resolution image frame is stored, and seamlessly provide the preview screen to the user. The display unit 500 is not limited to providing the preview screen, and may display the high-resolution image generated by the capture unit 600 to the user.

The display unit 500 may include any device capable of outputting an image. For example, the display unit 500 may include a computer, a mobile phone, and other image output terminals. The display unit 500 may be an example of an output device. Other examples of the output device include a graphics/display device, a computer screen, an alarm system, a computer aided design/computer aided machining (CAD/CAM) system, a video game station, a smart phone display screen, or any other type of data output device.

The capture unit 600 may load the high-resolution image data from the second memory 420 in which the post-processed high-resolution image frame is stored to generate a high-resolution image.

The device 10 for processing the high-resolution image according to the inventive concept may reduce or eliminate auto-focus delay, auto-exposure delay, and auto-white balance delay that occur when switching the photographing mode from a low-resolution mode to a high-resolution mode. However, the auto focus delay, the auto exposure delay, and the auto white balance delay are only some examples of delays that may occur in the device 10 for processing the high-resolution image, and there may be various delay factors in addition to the described delays. In addition, the device 10 for processing the high-resolution image according to the inventive concept may process a frame without any delay even without a frame drop, thereby improving the processing speed of the image frame. As used herein a "frame drop" refers to the dropping of a frame that has been processed while switching the photographing mode. In addition, the device 10 for processing the high-resolution image according to the inventive concept may not need to store all signals output by an image sensor in a memory, thereby reducing power consumption.

Figure 2:
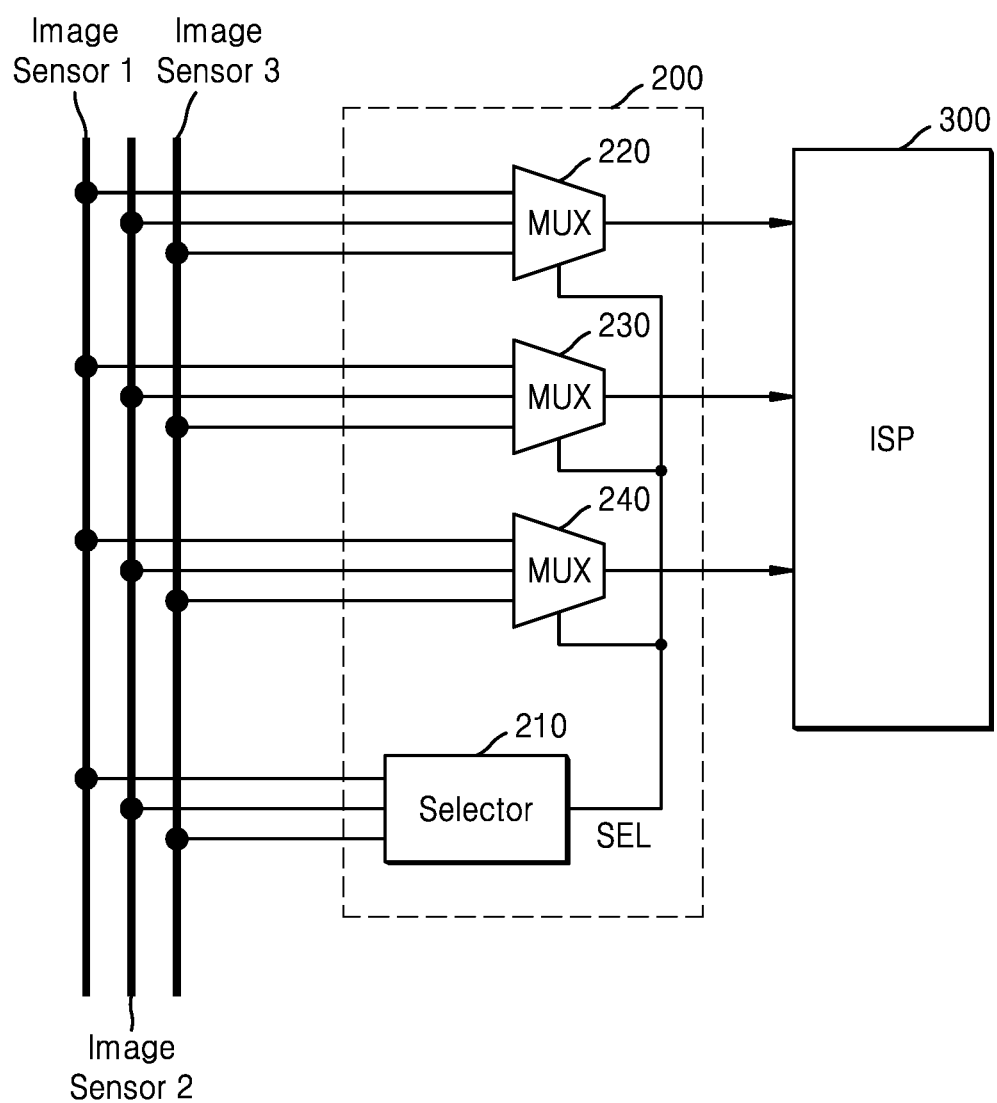
FIG. 2 is a circuit diagram illustrating a channel allocator according to embodiments of the inventive concept.

FIG. 2 is a circuit diagram illustrating the channel allocator 200 according to embodiments of the inventive concept. Referring to FIG. 2, the channel allocator 200 may include a selector 210 and a plurality of multiplexers (hereinafter referred to as MUXs) 220, 230, and 240. The channel allocator 200 may determine the resolution of an image frame based on a signal received from the image sensor 100 and dynamically allocate a path through which the signal is processed according to the resolution. According to an embodiment of the inventive concept, the channel allocator 200 may select any one of a plurality of image sensors and dynamically allocate image frames input from the selected one image sensor sequentially.

In addition to the image sensor shown in FIG. 1, the device 10 may further include a plurality of image sensors. For example, the device 10 may further include a plurality of image sensors to capture images of various angles and image quality, such as a front camera image sensor, a rear camera wide-angle image sensor, a rear camera proximity image sensor, etc.

The selector 210 may select an image sensor that captures a current object from among the plurality of image sensors. The selector 210 may receive image data sensed from all of the plurality of image sensors. The selector 210 may generate a selection signal SEL for selecting the image sensor that captures the current object from among the plurality of image sensors, and may simultaneously apply the selection signal SEL to all of the plurality of MUXs 220, 230, and 240. For example, the channel allocator 200 may receive image data sensed by an image sensor 1, an image sensor 2, and an image sensor 3, and at this time, the selector 210 may generate the selection signal SEL for selecting the image sensor (e.g., the image sensor 1) that needs to be currently processed and apply the selection signal SEL to the plurality of MUXs 220, 230, and 240. In FIG. 2, the selector 210 is included in the channel allocator 200, but is not limited thereto, and may be included in the ISP 300 or may be included in the image processor 250 of FIG. 1. In FIG. 2, three image sensors are illustrated for convenience of description, but the inventive concept is not limited thereto, and there may be a plurality of image sensors.

The MUXs 220, 230, and 240 may be logic circuits that select one of several input signals and transfer the selected input signal to one line.

Each of the plurality of MUXs 220, 230, and 240 may output image data of the selected image sensor to the ISP 300 based on the selection signal SEL applied from the selector 210. As described above, the ISP 300 is a multi-image signal processor and may be an IP capable of efficiently processing image data output from multiple image sensors. Each of the plurality of MUXs 220, 230, and 240 may simultaneously apply the image data with respect to the selected image sensor (e.g., the image sensor 1) to a plurality of channels of the ISP 300. Therefore, the plurality of channels provided in the ISP 300 may be originally configured to process image data from multiple image sensors, but instead may process an image frame having a different resolution of one image sensor (i.e., the image sensor 1) in the same way as if processing multiple image sensors. That is, referring to FIGS. 1 and 2 together, the low-resolution image frame, the medium-resolution image frame, and the high-resolution image frame are respectively applied to the first channel 310, the second channel 320 and the third channel 330 of the ISP 300, which may have a similar effect as applying image data of the image sensor 1, image sensor 2 and the image sensor 3 to ISP 300. In FIG. 2, for convenience of description, three MUXs are shown, but the inventive concept is not limited thereto, and the number of MUXs may be increased or decreased in various ways according to the level of resolution required to be processed by the device 10 or according to the number of channels that the ISP 300 may simultaneously process.

Figure 3:
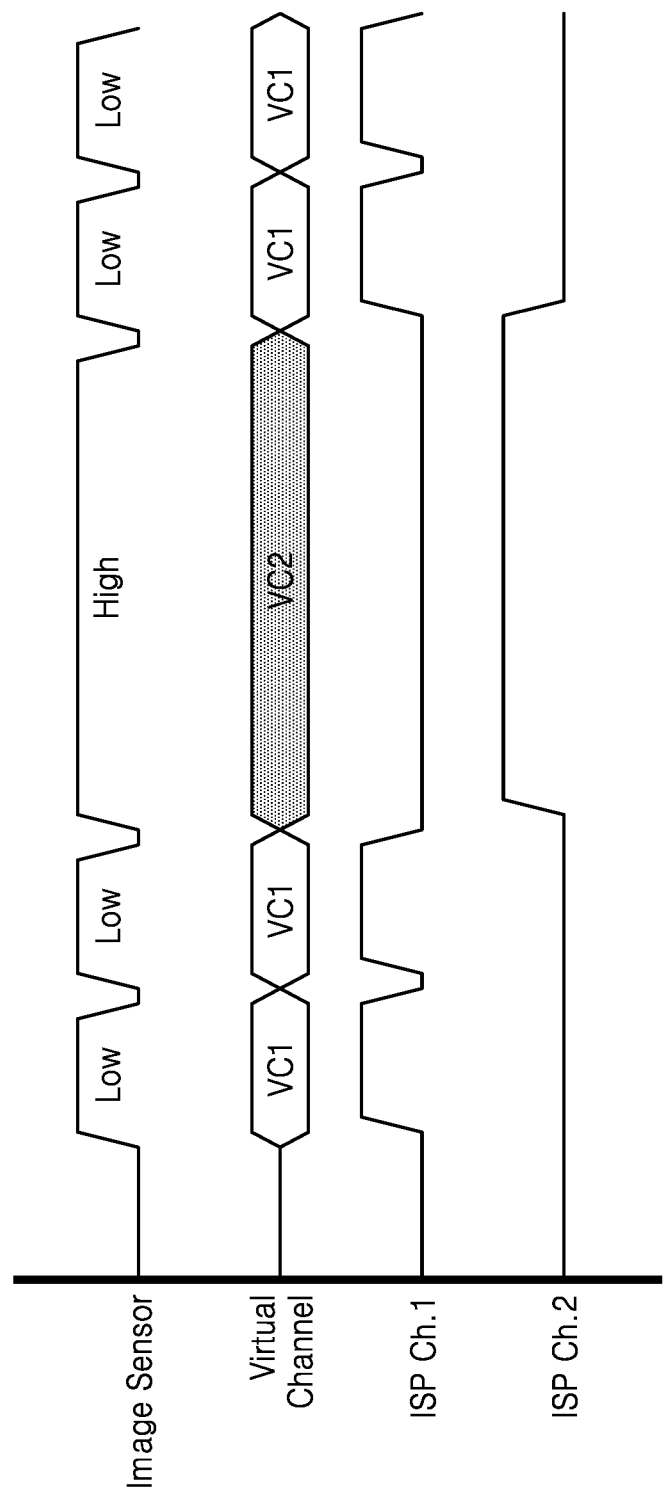
FIG. 3 is a timing diagram of signals processed by an image sensor and an ISP based on channels according to embodiments of the inventive concept.

FIG. 3 is a timing diagram of signals processed by the image sensor 100 and the ISP 300 based on channels according to embodiments of the inventive concept. Specifically, image frames sensed by the image sensor 100 are divided according to resolutions, and a virtual channel 1 and a virtual channel 2 in which a low-resolution image frame is processed are illustrated. Additionally, the signal processing timing of the first channel 310 and the second channel 320 that process the image frames of the image sensor 100 for each resolution is also illustrated. Here, the horizontal axis indicates time, and the rising/falling of an edge may be configured in units of frames.

Referring to FIG. 3, the image sensor 100 may sense a low-resolution image Low frame and a high-resolution image High frame. For example, the image sensor 100 may sense first two frames as the low-resolution image Low and generate the frame information FI corresponding to the low-resolution image Low. In the device 10, the low-resolution image Low may have been previously determined to be allocated to the first channel 310 with an environment configuration to process the low-resolution image Low. The channel allocator 200 may read the frame information FI from the received signal to determine that the currently received image frame has low-resolution and allocate the image frame to the first channel 310 of the ISP 300. In other words, when the low-resolution image Low is sensed by the image sensor 100, the low-resolution image Low may be transmitted to the first channel 310 of the ISP 300, and the ISP 300 may efficiently post-process low-resolution image data using the first channel 310 with the environment configuration to process the low-resolution image Low.

The image sensor 100 may sense a third frame as the high-resolution image High. In the device 10, the high-resolution image High may have been previously determined to be allocated to the second channel 320 with an environment configuration to process the high-resolution image High. The channel allocator 200 may read the frame information FI from the received signal to determine that the currently received image frame has high-resolution, and allocate the image frame to the second channel 320 of the ISP 300. In other words, when the high-resolution image High is sensed by the image sensor 100, the high-resolution image High is transmitted to the second channel 320 of the ISP 300, and the ISP 300 may efficiently post-process high-resolution image data using the second channel 320 with the environment configuration to process the high-resolution image High.

The image sensor 100 may subsequently sense the fourth and fifth frames as the low-resolution image Low. A process of processing a low-resolution image frame is the same as described above, and thus, further detailed description of the process is omitted.

The virtual channel described with reference to FIG. 3 may mean a virtual channel according to the MIPI standard.

Figure 4:
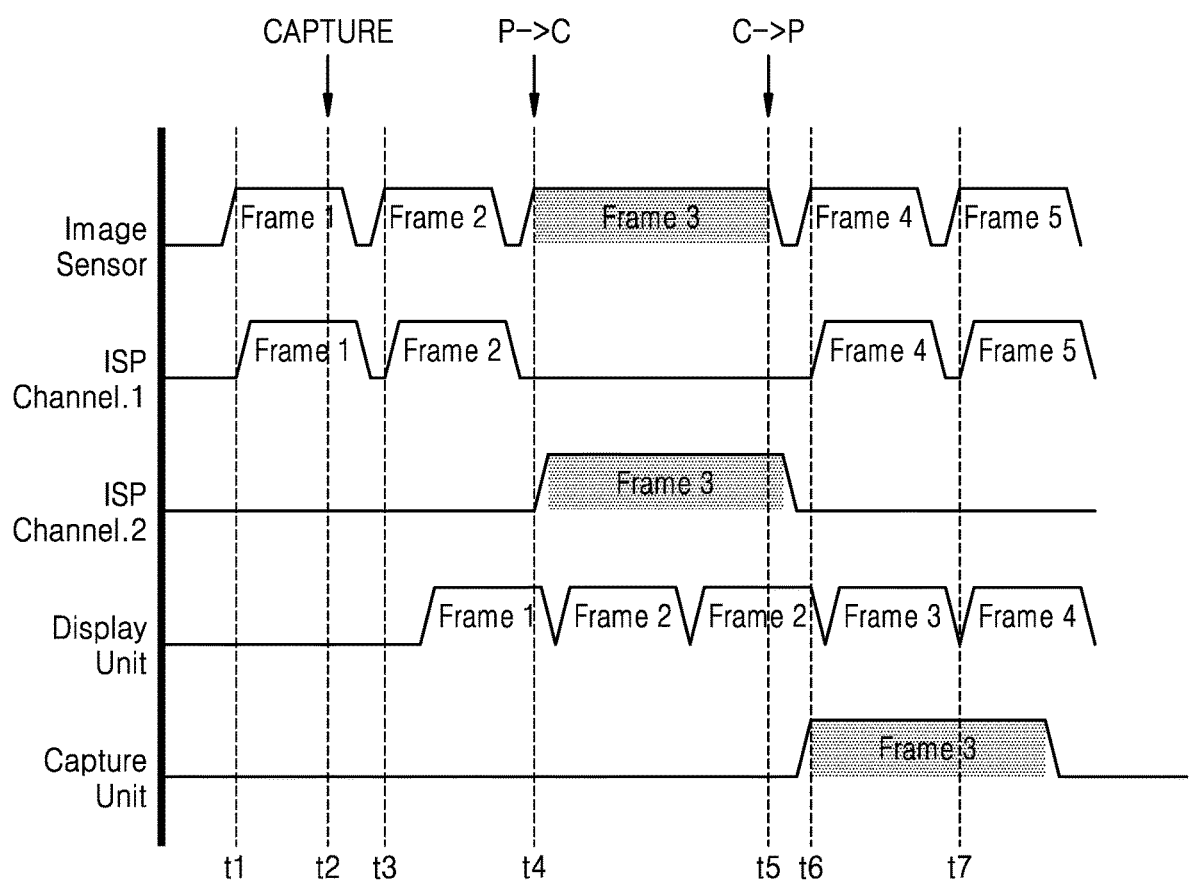
FIG. 4 is a timing diagram of signals processed by an image sensor and an ISP based on channels according to an embodiment of the inventive concept.

FIG. 4 is a timing diagram of signals processed by the image sensor 100 and the ISP 300 based on channels according to an embodiment of the inventive concept. Specifically, image frames sensed by the image sensor 100 are divided according to resolutions, the signal processing timing of the first channel 310 and the second channel 320 that process the image frames of the image sensor 100 for each resolution is illustrated, the signal processing timing of the display unit 500 that continuously displays the low-resolution image frame is illustrated, and the signal processing timing of the capture unit 600 that generates the high-resolution image frame in response to the capture command CAPTURE is illustrated. FIGS. 1 and 4 are referred to together.

Initially, the image sensor 100 may set a photographing mode of the device 10 to a low-resolution mode P in which a low-resolution image is sensed. At time t1, the image sensor 100 may sense a first image frame of a captured object as the low-resolution image. Because the speed at which sensed data is transmitted is limited, after a predetermined time has elapsed from time t1, the sensed low-resolution image may be post-processed in the first channel 310.

At time t2, the device 10 may receive the capture command CAPTURE. It may take a predetermined time for the image sensor 100 to switch the photographing mode. As illustrated in FIG. 4, the image sensor 100 does not complete the switch of the photographing mode until time t4.

At time t3, because the photographing mode is not completely switched, the image sensor 100 may still sense the second frame as the low-resolution image. After the predetermined time required for the low-resolution image to be post-processed in the first channel 310, the display unit 500 may display a preview screen with respect to the first frame.

At time t4, in response to the CAPTURE command at time t2, the photographing mode of the image sensor 100 may be changed from the low-resolution mode P to a high-resolution mode C, and the image sensor 100 may sense a third image frame as the high-resolution image. Similar to the case in which sensed low-resolution image frame is transmitted to the ISP 300, the speed at which the sensed high-resolution image frame is transmitted to the ISP 300 is also limited. Therefore, after a predetermined time has elapsed at time t4, the sensed high-resolution image may be post-processed by the post-processor 340 through the second channel 320.

The display unit 500 may continuously provide preview screens with respect to image frames at a constant time interval (e.g., ⅟₆₀ second and a display speed of 60 fps (frames per second)). For example, the display unit 500 may start to provide the preview screen by displaying the first frame Frame 1 input through the first channel 310 and processed by the post-processor 340 between the time t3 and time t4. After a certain period of time has elapsed from displaying the first frame Frame 1, the display unit 500 may provide the preview screen with respect to the second frame Frame 2 following the first frame Frame 1.

Moreover, given an illustrative constant time interval of ⅟₆₀ second, and the time needed to sense high-resolution Frame 3, transmit high-resolution image Frame 3 to the post-processor 340, and post-process high-resolution Frame 3, the display unit 500 may display the already displayed second frame Frame 2 again when the third frame Frame 3 needs to be displayed but has not been completely sensed or has not been completely post-processed by the ISP 300. The display unit 500 may display the third frame Frame 3 in response to the completion of processing of the third frame Frame 3 by the ISP 300. At time t5, the photographing mode may be changed again to the low-resolution mode P after sensing of the third image frame is completed. That is, the image sensor 100 may sense only one frame (the third frame) as the high-resolution image in response to the capture command CAPTURE. After the predetermined time (from t4 to t5, or (t5-t4)) for the image sensor 100 to change the photographing mode, the image sensor 100 may sense the fourth frame Frame 4 again as the low-resolution image, and the ISP 300 may process the fourth frame Frame 4 input to the first channel 310.

At time t6, the capture unit 600 may load the image data post-processed by the ISP 300 and stored in the second memory 420, thereby generating a high-resolution image with respect to the third frame Frame 3.

At time t7, the image sensor 100 may sense the low-resolution image with respect to a fifth frame, and the ISP 300 may post-process the image data received by the first channel 310 at time t7 after a predetermined time has elapsed. In an embodiment, the display unit 500 may display the fourth frame Frame 4 regardless of whether the image sensor 100 or the ISP 300 is processing the fifth frame Frame 5. In other words, the display unit 500 may provide the preview screens from the first frame Frame 1 to the fourth frame Frame 4 consecutively from time t3, and may twice display the second frame Frame 2 in which the next frame (e.g., the third frame Frame 3) among the frames has not been processed. According to an embodiment, the display unit 500 may display the preview screen, but is not limited thereto, and may display the high-resolution image generated by the capture unit 600 for a predetermined time instead of preview.

The frame rate (or scan rate) of the display unit 500 may be the same as or faster than the image frame sensing rate of the image sensor 100. In an embodiment, the image frame sensing rate of the image sensor 100 may be 24 frames per second (fps), and the frame rate (or scan rate) of the display unit 500 may be 60 fps, but is not limited thereto.

In the device 10 according to the inventive concept, the number of image frames sensed by the image sensor 100 as high-resolution images is limited to only as many as is needed in response to the user's capture command CAPTURE. Other image frames are sensed by the image sensor 100 as low-resolution images. That is, the device 10 may set the photographing mode to the low-resolution mode P, and then switch the low-resolution mode P to the high-resolution mode C only when there is the capture command CAPTURE, and immediately after sensing the high-resolution image, change back the high-resolution mode C to the low-resolution mode P, thereby reducing power consumption required to sense an object as the high-resolution image.

Figure 5:
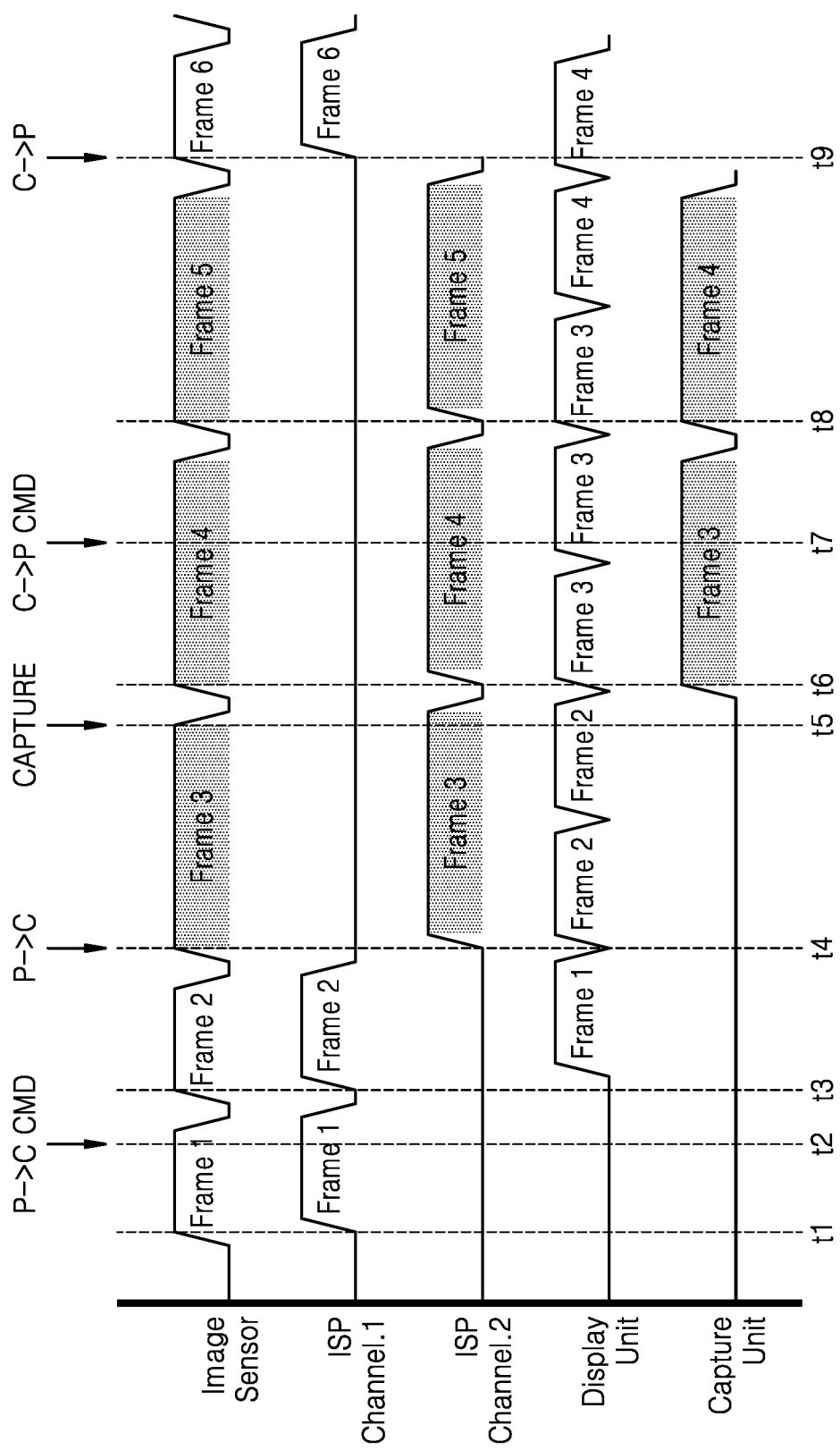
FIG. 5 is a timing diagram of signals processed by an image sensor and an ISP based on channels according to another embodiment of the inventive concept.

FIG. 5 is a timing diagram of signals processed by the image sensor 100 and the ISP 300 based on channels according to another embodiment of the inventive concept. The horizontal and vertical axes and the signals shown in FIG. 5 are similar to those in FIG. 4. It is similar to FIG. 4 that the frame rate (or scan rate) of the display unit 500 may be the same as or faster than the image frame sensing rate of the image sensor 100.

FIG. 1 is also referenced to describe FIG. 5.

Initially, the image sensor 100 may set a photographing mode to the low-resolution mode P for sensing a low-resolution image if no command is received from the device 10. At the time t1, the image sensor 100 may sense a first image frame of a captured object as the low-resolution image. After a predetermined time has elapsed from the time t1, the sensed low-resolution image may be transmitted through the first channel 310 and post-processed.

At the time t2, the image processor 250 issues a high-resolution switching command (P→C CMD), and the issued high-resolution switching command (P→C CMD) is input to the image sensor 100. It may take a predetermined time to change the photographing mode of the image sensor 100. As illustrated in FIG. 5, the image sensor 100 does not complete the switch of the photographing mode until time t4.

At the time t3, the image sensor 100 has not completely changed the photographing mode, and thus, the image sensor 100 senses a low-resolution image of a second frame. After a predetermined time has elapsed from the time t3, the display unit 500 may load image data processed by the ISP 300 and stored in the first memory 410 and provide a preview screen with respect to the first frame Frame 1 to a user.

At the time t4, in response to the issued high-resolution switching command (P→C CMD), the photographing mode of the image sensor 100 may be changed to the high-resolution mode C. The image sensor 100 may sense a third frame as a high-resolution image, and image data received through the second channel 320 may be post-processed by the post-processor 340. While the image data of the third frame Frame 3 is post-processed, the display unit 500 may seamlessly provide a preview screen with respect to the second frame Frame 2. Because the display unit 500 displays an image at a constant time interval (e.g., 1/60 second), the display unit 500 may display the already displayed second frame Frame 2 again when the third frame Frame 3 needs to be displayed but has not been completely sensed or has not been completely post-processed by the ISP 300.

At the time t5, the user's capture command CAPTURE may be received. Because the image sensor 100 has already changed the photographing mode to the high-resolution mode C in response to the high-resolution switching command (P→C CMD) of the image processor 250, a separate photographing mode change time is not necessary.

At the time t6, the capture unit 600 may immediately generate a high-resolution image of the third frame Frame 3. Because the time t5 when the capture command CAPTURE is received is during the sensing of the third frame Frame 3 or the time when the user is provided with a preview screen with respect to the third frame Frame 3 through the display unit 500, image data of the third frame Frame 3 may be captured.

At the time t7, the image processor 250 issues a low-resolution conversion command (C→P CMD), and the issued high-resolution conversion command (P→C CMD) is input to the image sensor 100. It may take a predetermined time to change the photographing mode of the image sensor 100 as in the case of high-resolution switching. According to an embodiment, the display unit 500 may display the already displayed third frame Frame 3 again when the fourth frame Frame 4 needs to be displayed but has not been completely sensed or has not been completely post-processed by the ISP 300.

At the time t8, the image sensor 100 may sense a high-resolution image of a fifth frame Frame 5. The capture unit 600 may generate a high-resolution image of the fourth frame Frame 4 that has already been post-processed by the ISP 300.

At the time t9, the photographing mode of the image sensor 100 may be changed back to the low-resolution mode P. The image sensor 100 may sense a sixth frame Frame 6 as a low-resolution image. The display unit 500 may display the fourth frame Frame 4 because the post-processing of the fifth frame Frame 5 has not been completed.

Continuously from the time t3, the display unit 500 may load the image frames post-processed by the ISP 300 through the first channel 310 or the second channel 320 from the memory subsystem 400 to seamlessly provide the preview screen to the user. According to an embodiment, the display unit 500 may provide an image frame post-processed through at least one of the first channel 310 and the second channel 320 of the ISP 300 to the user. According to an embodiment, the display unit 500 may display the preview screen, but is not limited thereto, and may display a high-resolution image generated by the capture unit 600 for a predetermined time instead of preview.

The device 10 according to the inventive concept may change the photographing mode in advance by the image processor 250 before the capture command CAPTURE. For example, the image processor 250 may change the photographing mode in advance, and if there is the user's capture command CAPTURE, immediately may refer to the photographing mode for taking a picture as a capture preparation mode. In the capture preparation mode, auto-focusing may be fixed in order to quickly process an object in high-resolution. Accordingly, the device 10 may reduce or eliminate the delay time (i.e., shutter-leg time) between the time of the shutter operation and the time when the high-resolution image is completely processed when capturing. The virtual channel described with respect to FIG. 5 may mean a virtual channel according to the MIPI standard.

Figure 6:
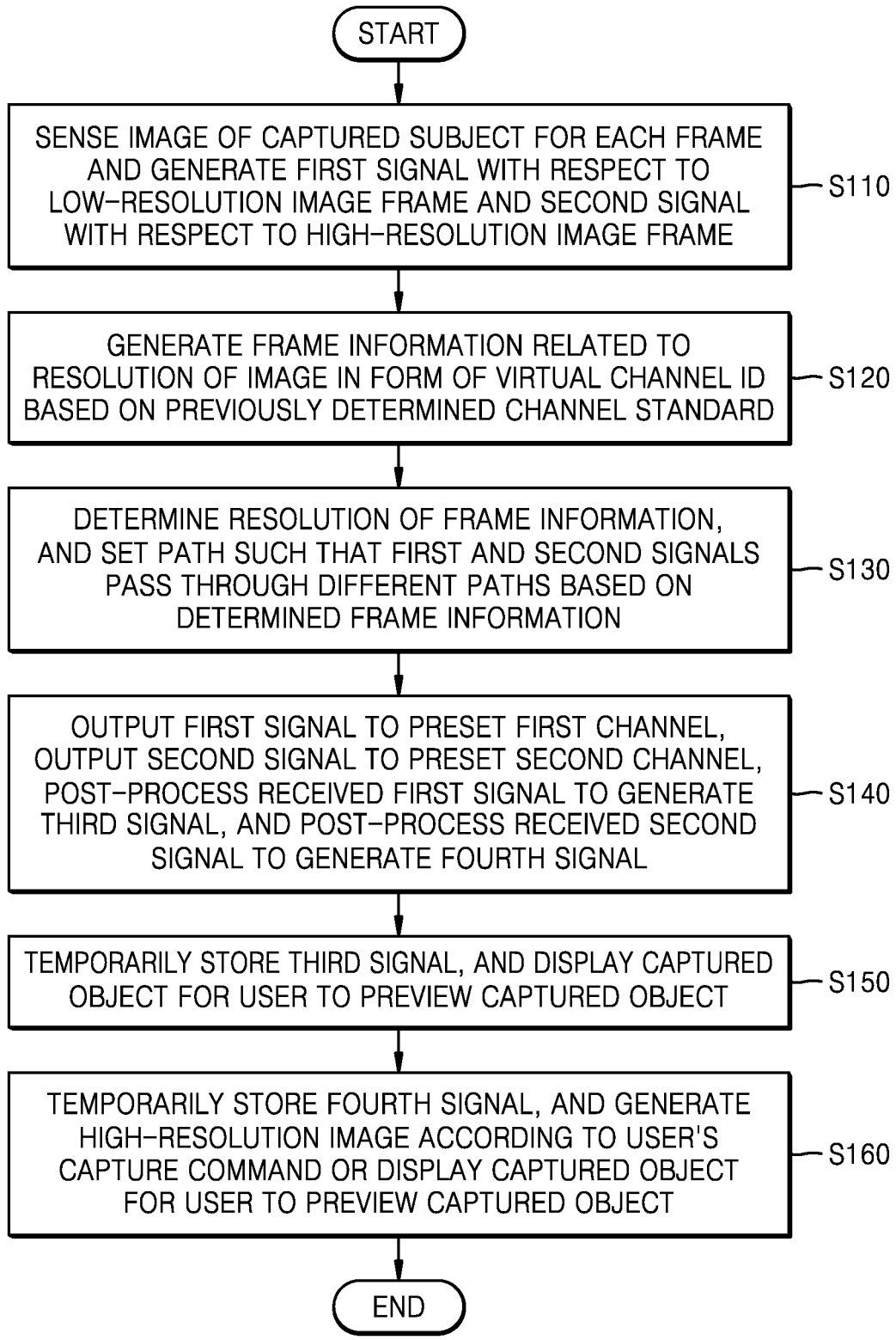
FIG. 6 is a flowchart of an image processing method according to embodiments of the inventive concept.

FIG. 6 is a flowchart of an image processing method according to embodiments of the inventive concept. Referring to FIGS. 1 and 6, the image sensor 100 of the device 10 may receive an image of a captured subject (or object) for each frame, and generate a first signal (e.g., a binary signal containing low-resolution image frame) with respect to a low-resolution image frame and a second signal (e.g., a binary signal containing high-resolution image frame) with respect to a high-resolution image frame (S110).

The image sensor 100 may generate the frame information FI related to the resolution of the image in the form of a virtual channel ID or in the form of embedded data based on a previously determined channel standard (e.g., the MIPI standard) (S120). The frame information FI may be generated according to the resolution of the image, but is not limited thereto. A signal carrying the generated frame information FI is output to the channel allocator 200. The frame information FI may be carried as header information of the signal.

The channel allocator 200 may read the frame information FI of the received signal, determine the resolution of the received image frame, and set a path such that the first and second signals pass through different paths based on the determined resolution (S130).

The channel allocator 200 may output the first signal corresponding to the low-resolution image frame to the first channel 310 with an environment configuration to efficiently process the low-resolution image, and output the second signal corresponding to the high-resolution image frame to the second channel 320 with an environment configuration to efficiently process the high-resolution image. The ISP 300 may post-process the received first signal to generate a third signal corresponding to the low-resolution image, and post-process the received second signal to generate a fourth signal corresponding to the high-resolution image (S140).

The memory subsystem 400 may temporarily store the third signal, and the display unit 500 may display the captured object for a user to preview the captured object (S150). In addition, the memory subsystem 400 may temporarily store the fourth signal, and the capture unit 600 may generate a high-resolution image according to a user's capture command, and/or generate a low-resolution image corresponding to the fourth signal to display the captured object for the user to preview the captured object (S160). That is, the high-resolution image frame may be post-processed and simultaneously the low-resolution image of the corresponding frame may be generated and displayed on a preview screen using a scaler, but the inventive concept is not limited thereto. Here, the meaning that the third or fourth signal is stored may be understood to mean that binary data in which the third or fourth signal is post-processed is stored.

Figure 7:
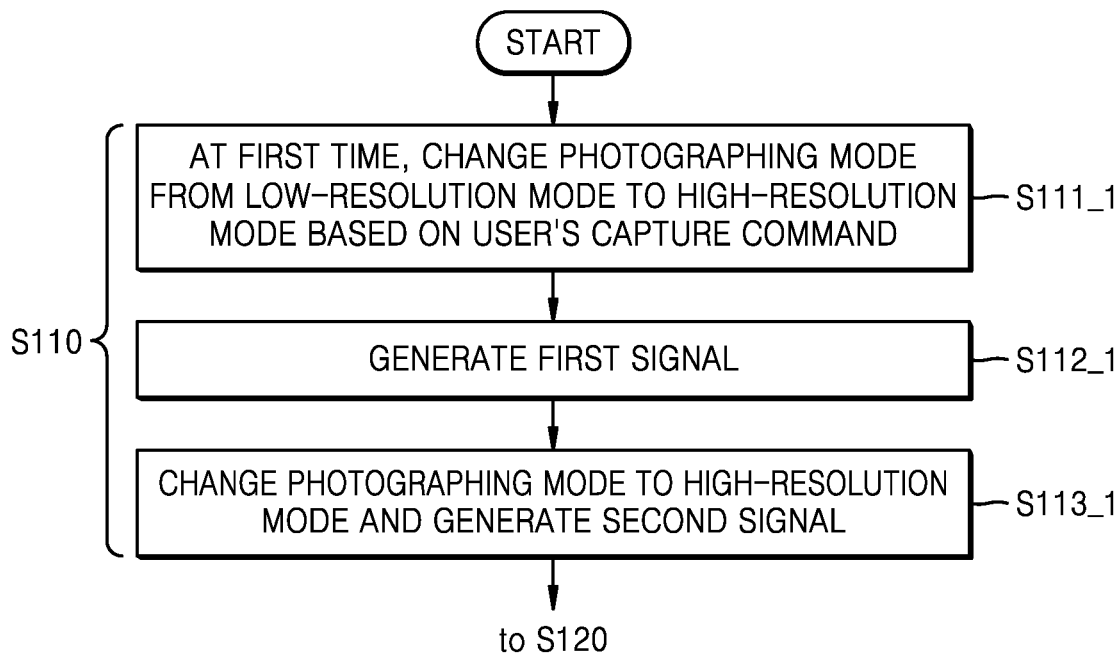
FIGS. 7, 8, and 9 are more detailed flowcharts of an image processing method according to an embodiment of the inventive concept.
Figure 8:
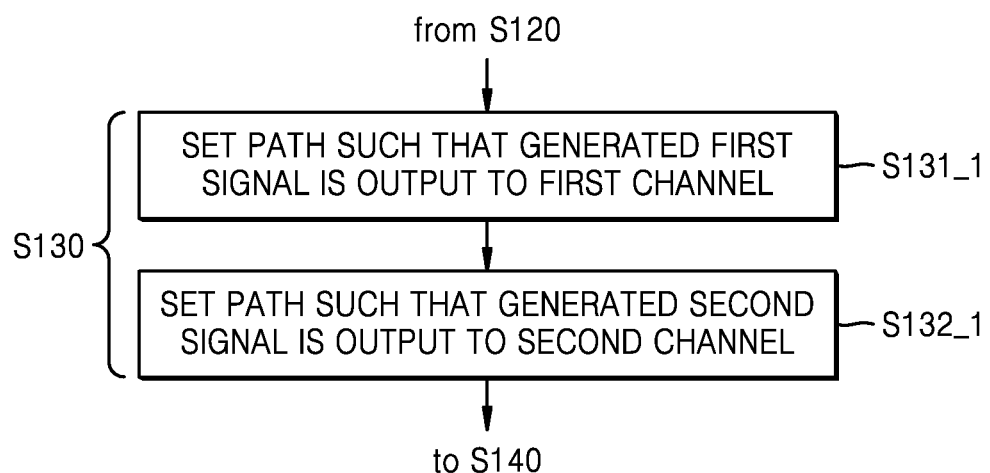
Figure 9:
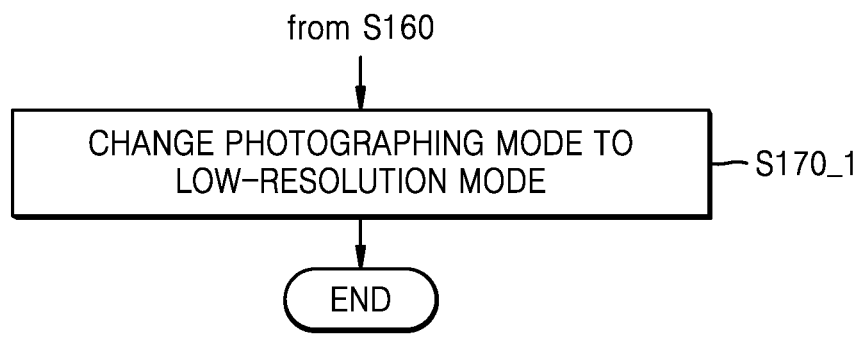

FIGS. 7, 8, and 9 are more detailed flowcharts of an image processing method according to an embodiment of the inventive concept.

FIG. 7 is a more detailed flowchart of operation S110 of FIG. 6 according to an embodiment of the inventive concept. Referring to FIGS. 1, 4, 6, and 7 together, at a first time (t2 in FIG. 4), the image processor 250 may issue a command for changing a photographing mode from a low-resolution mode to a high-resolution mode based on the user's capture command ("CAPTURE" in FIG. 4) (S111_1). The image sensor 100 may sense a low-resolution image to generate the first signal (e.g., a low-resolution image frame binary signal) at a second time (t3 in FIG. 4) at which the low-resolution mode has not been changed to the high-resolution mode (S112_1). Thereafter, the image sensor 100 may change the photographing mode to the high-resolution mode at a third time (t4 in FIG. 4) and generate the second signal (e.g., a high-resolution image frame binary signal) corresponding to the high-resolution image (S113_1).

FIG. 8 is a more detailed flowchart illustrating operation S130 of FIG. 6 according to an embodiment of the inventive concept. Referring to FIGS. 1, 4, 6, and 8 together, after operation S120, at the second time (t3 in FIG. 4), the channel allocator 200 may set (i.e., allocate) a path such that the generated first signal (e.g., a low-resolution image frame binary signal) is output to the first channel 310 of the ISP 300 (S131_1). Then, at the third time (t4 in FIG. 4), the channel allocator 200 may set (i.e., allocate) a path such that the generated second signal (e.g., a high-resolution image frame binary signal) is output to the second channel 320 of the ISP 300 (S132_1).

FIG. 9 is a flowchart showing an operation further added to the operations of FIG. 6 according to an embodiment of the inventive concept. Referring to FIGS. 1, 4, 6 and 9 together, after operation S160, the image sensor 100 may change a photographing mode again to the low-resolution mode (P of FIG. 4) at the fourth time (t5 of FIG. 4) immediately after sensing the high-resolution image (S170_1).

FIGS. 7 to 9 are similar to FIG. 4 according to an embodiment of the inventive concept, and thus redundant descriptions are omitted.

Figure 10:
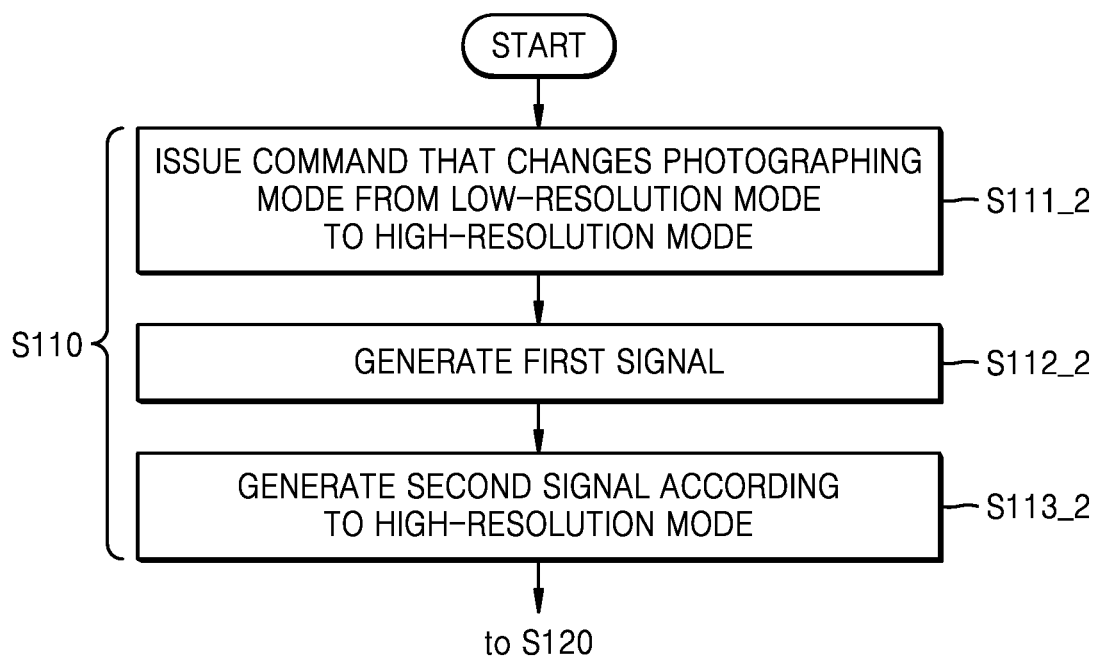
FIGS. 10, 11, 12, and 13 are more detailed flowcharts of an image processing method according to another embodiment of the inventive concept.

FIGS. 10, 11, 12, and 13 are more detailed flowcharts of an image processing method according to another embodiment of the inventive concept. FIG. 10 is a flowchart illustrating operation S110 of FIG. 6 in more detail according to another embodiment of the inventive concept. Referring to FIGS. 1, 5, 6 and 10 together, the image processor 250 may issue a high-resolution switching command (P→C CMD) that changes a photographing mode from a low-resolution mode to a high-resolution mode at a first time (t2 in FIG. 5), and the image sensor 100 may receive the high-resolution switching command (P→C CMD) (S111_2). The image sensor 100 may sense a low-resolution image to generate a first signal at a second time (t3 in FIG. 5) before switching to the high-resolution mode (C in FIG. 5) (S112_2). Thereafter, the image sensor 100 is changed to the high-resolution mode at the third time (t4 in FIG. 5), and accordingly, sense a high-resolution image to generate a second signal (S113_2).

Figure 11:
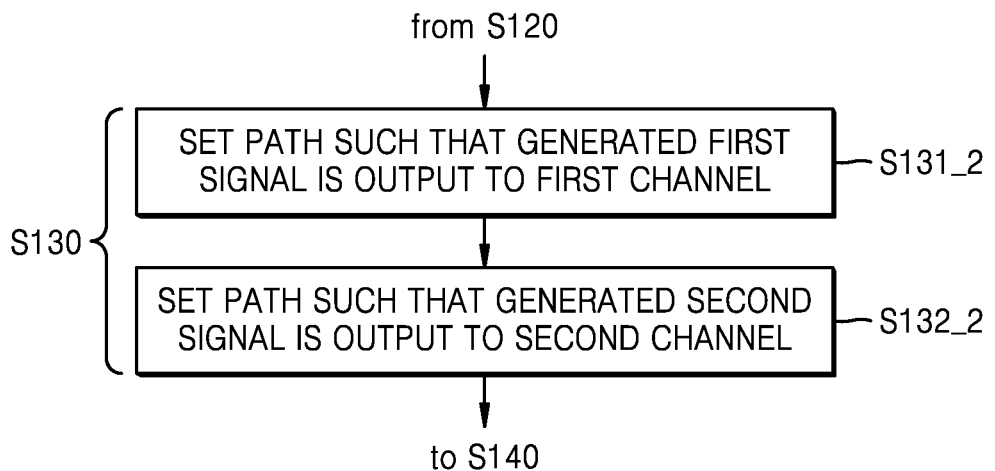

FIG. 11 is a more detailed flowchart of operation S130 of FIG. 6 according to another embodiment of the inventive concept. Referring to FIGS. 1, 5, 6 and 11 together, after operation S120, at the second time (t3 in FIG. 5), the channel allocator 200 may set (i.e., allocate) a path such that the generated first signal (e.g., a low-resolution image frame binary signal) is output to the first channel 310 of the ISP 300 (S131_2). In addition, at the third time (t4 in FIG. 5), the channel allocator 200 may set (i.e., allocate) a path such that the generated second signal (e.g., a high-resolution image frame binary signal) is output to the second channel 320 of the ISP 300 (S132_2).

Figure 12:
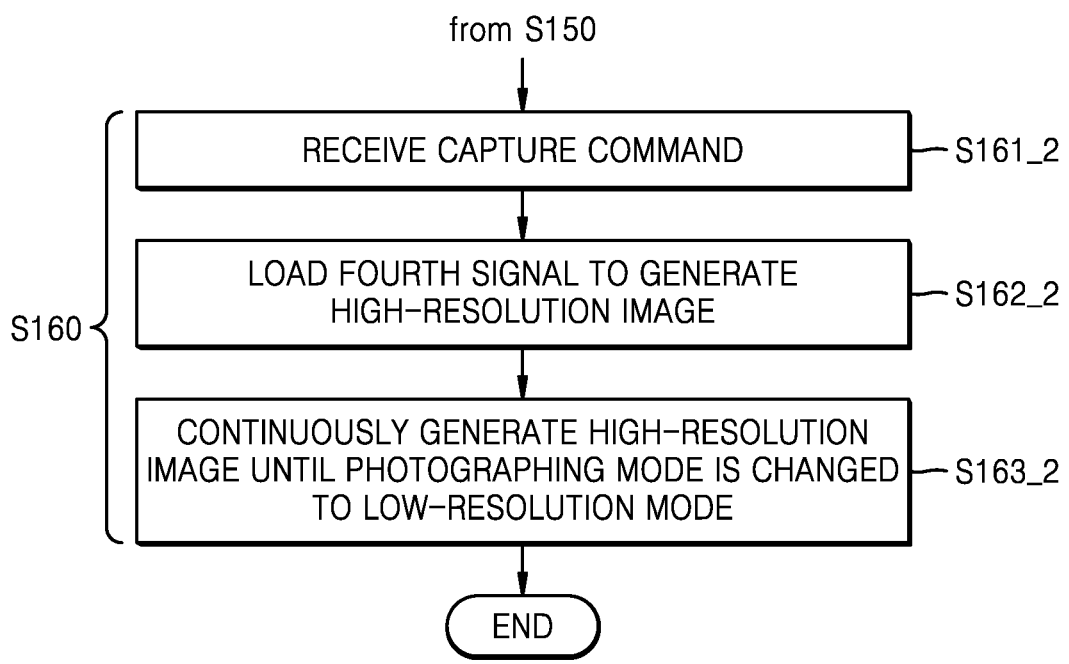

FIG. 12 is a more detailed flowchart of operation S160 of FIG. 6 according to another embodiment of the inventive concept. Referring to FIGS. 1, 5, 6 and 12 together, after operation S150, the image sensor 100 may receive the capture command ("CAPTURE" in FIG. 5) at a fourth time (t5 in FIG. 5) (S161_2). The capture unit 600 may generate a high-resolution image by loading a fourth signal obtained by post-processing the second signal corresponding to the high-resolution image from the second memory 420 (S162_2). However, the inventive concept is not limited thereto, and the capture unit 600 may simultaneously generate a low-resolution image corresponding to the fourth signal and a high-resolution image and load the low-resolution image and the high-resolution image into the first memory 410 to display the low-resolution image and the high-resolution image on the display unit 500. The image sensor 100 may continuously sense the high-resolution image until the photographing mode is changed to the low-resolution mode, and the capture unit 600 may generate the high-resolution image (S163_2).

Figure 13:
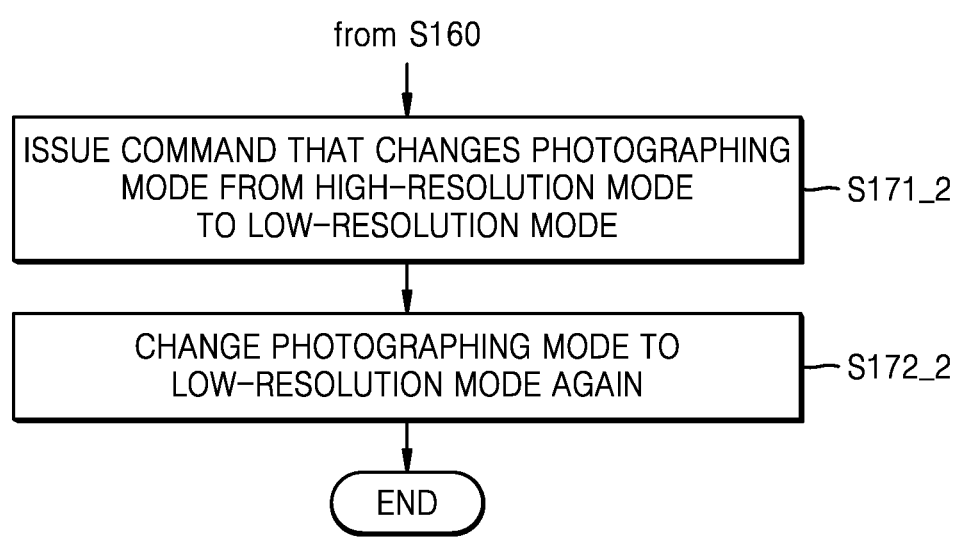

FIG. 13 is a flowchart showing an operation added to the operations of FIG. 6 according to another embodiment of the inventive concept. Referring to FIGS. 1, 5, 6 and 13 together, after operation S160, at a fifth time (t7 in FIG. 5), the image processor 250 may issue a command to change the photographing mode from the high-resolution mode (C in FIG. 5) to the low-resolution mode (P in FIG. 5) again (S171_2). The image sensor 100 may switch the photographing mode back to the low-resolution mode P at a sixth time (t9 in FIG. 5) after a predetermined time has elapsed (S172_2).

FIGS. 10 to 13 are similar to FIG. 4 according to an embodiment of the inventive concept, and thus redundant descriptions are omitted.

Figure 14:
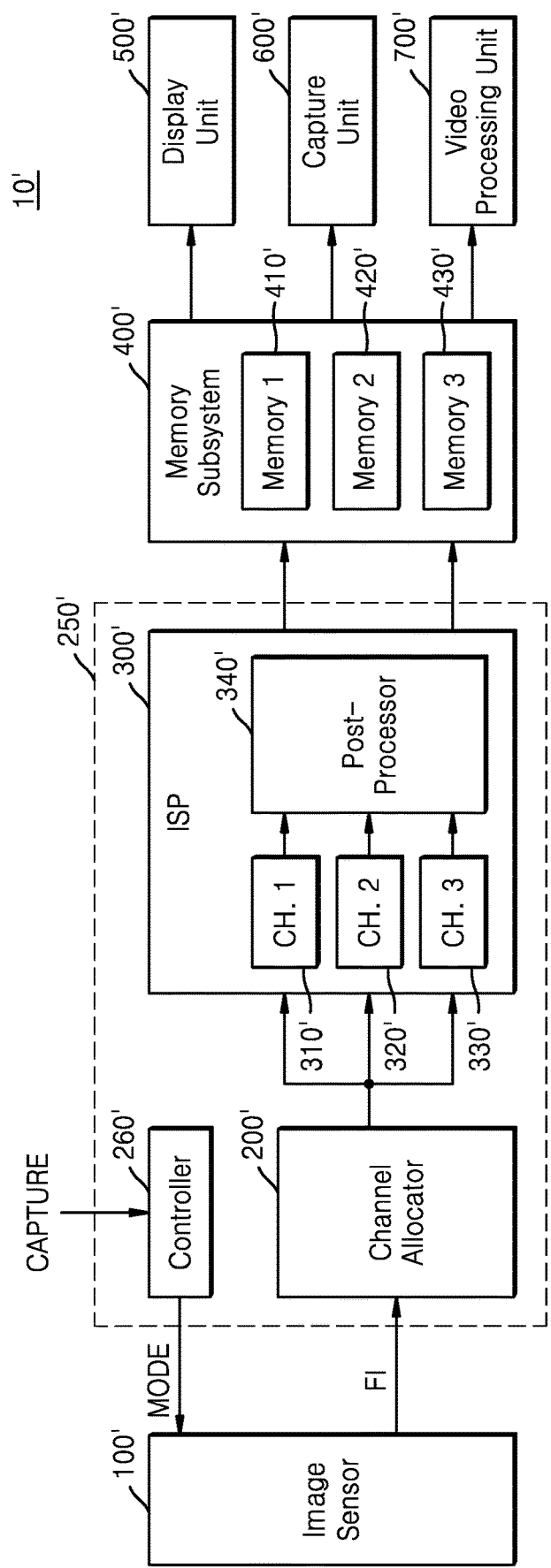
FIG. 14 is a block diagram illustrating a device according to embodiments of the inventive concept.

FIG. 14 is a block diagram illustrating a device 10' according to embodiments of the inventive concept. FIG. 1 is also referred to.

Referring to FIG. 14, the device 10' according to an embodiment of the inventive concept may include an image sensor 100', a channel allocator 200', a controller 260', an image processor 250' including an ISP 300', a memory subsystem 400', a display unit 500', a capture unit 600', and a video processing unit 700'. The image processor 250' may include the channel allocator 200', the controller 260', and the ISP 300', and the ISP 300' may include a first channel 310', a second channel 320', a third channel 330' and a post-processor 340'. Each functional unit of FIG. 14 is similar to each functional unit already described with respect to FIG. 1, and thus redundant descriptions are omitted.

In addition to a first memory 410' and a second memory 420', a memory subsystem 400' may include a third memory 430' for other purposes, such as video recording, and storing both image data corresponding to a low-resolution image frame and image data corresponding to a high-resolution frame among image data received from the ISP 300'.

The video processing unit 700' may be included in the device 10' separately from the capture unit 600' to efficiently process a video among images captured by the device 10', and in this case, the capture unit 600' may process a still picture. The video processing unit 700' may load a third signal corresponding to the low-resolution image or a fourth signal corresponding to the high-resolution image to generate a compressed video stream.

Because the still picture and the video have different image features, throughput to be calculated, and compression methods, the still picture and the video may be efficiently processed to suit each characteristic through different IPs.

According to an embodiment of the inventive concept, the capture unit 600' may include a codec and a hardware accelerator for processing the still picture, and the video processing unit 700' may include a codec and a hardware accelerator for processing the video.

The still picture processed by the capture unit 600' may be stored in the first memory 410' and/or the second memory 420', and the video processed by the video processing unit 700' may be stored in the first memory 410' and/or the second memory 420', or may be stored in a separate memory, that is, the third memory 430'. Because the resolution of the video and the size of the video are different from the resolution of the still picture and the size of the still picture, the still picture and the video may be efficiently stored and processed in a separate memory. However, the inventive concept is not limited thereto, and the video may be stored using the first memory 410' and the second memory 420'.

Figure 15:
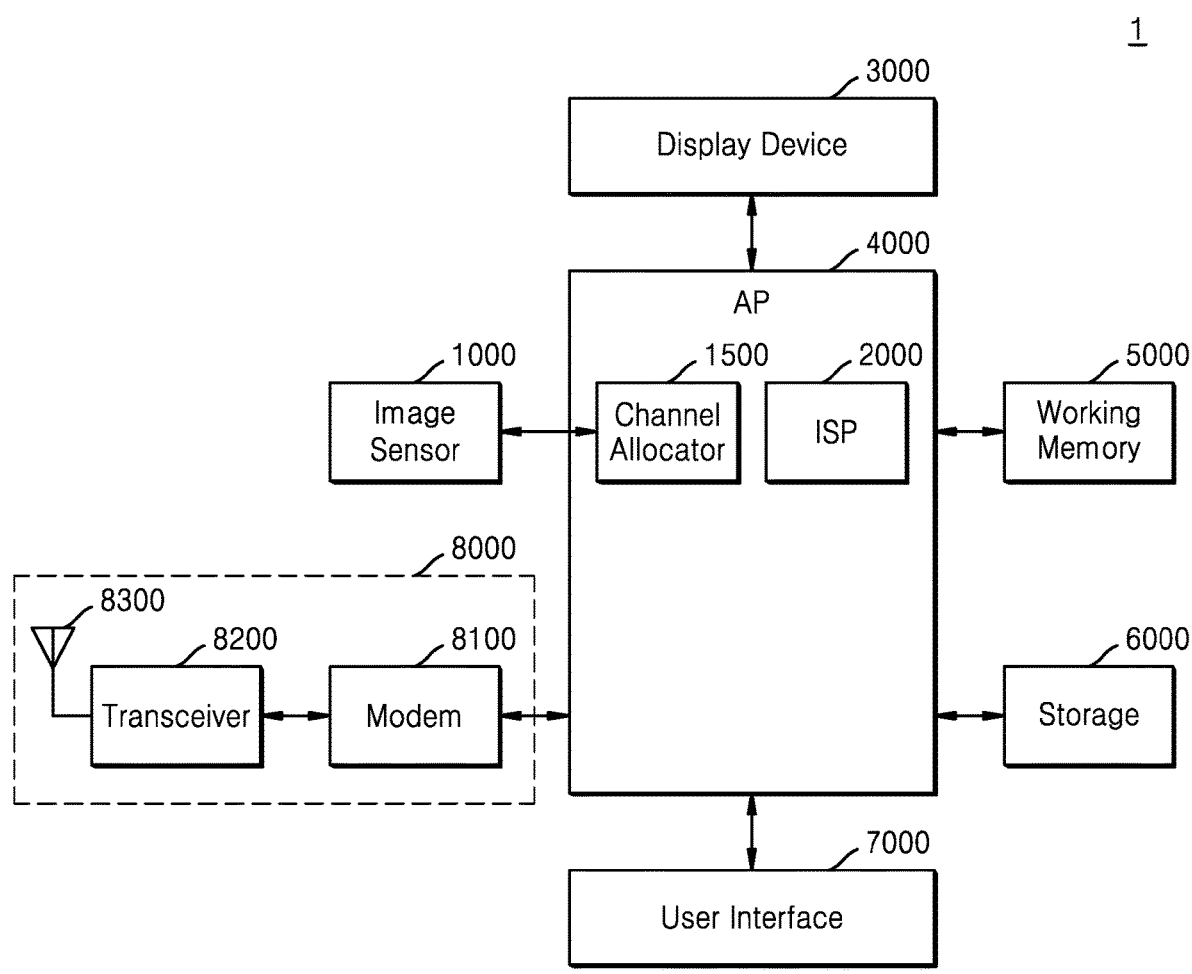
FIG. 15 is a block diagram illustrating a system including a device according to embodiments of the inventive concept.

FIG. 15 is a block diagram illustrating a system 1 including a device according to embodiments of the inventive concept. Referring to FIG. 15, the system 1 according to an embodiment of the inventive concept may include an image sensor 1000, a channel allocator 1500, an ISP 2000, a display device 3000, an application processor (AP) 4000, a working memory 5000, a storage 6000, a user interface 7000, and a wireless transceiver 8000, and the ISP 2000 may be implemented as an integrated circuit separate from the AP 4000. The image sensor 1000 of FIG. 15 may be similar to the image sensor 100 of FIG. 1, and the channel allocator 1500 of FIG. 15 may be similar to the channel allocator 200 of FIG. 1. The ISP 2000 of FIG. 15 may be similar to the ISP 300 of FIG. 1, the working memory 5000 of FIG. 15 may be similar to the memory subsystem 400 of FIG. 1, and the display device 3000 of FIG. 15 may be similar to the display unit 500 of FIG. 1. In addition, the AP 4000 of FIG. 15 may include the image processor 250 of FIG. 1.

The image sensor 1000 may generate image data based on a received optical signal and provide binary data to the ISP 2000, and may perform image processing similarly to the ISP 2000 if necessary. The AP 4000 may control overall operation of the system 1 and may be provided as a system-on-chip (SoC) that drives an application program, an operating system, etc. The AP 4000 may control the operation of the ISP 2000 and may provide the converted image data generated by the ISP 2000 to the display device 3000 or store the image data in the storage 6000.

The working memory 5000 may store programs and/or data that the AP 4000 processes or executes. The storage 6000 may be implemented as a non-volatile memory device such as a NAND flash or a resistive memory, and, for example, the storage 6000 may be provided as a memory card (e.g., an MMC memory card, an eMMC memory card, an SD memory card, or a micro SD memory card). The storage 6000 may store data and/or program with respect to an execution algorithm that controls the image processing operation of the ISP 2000, and when the image processing operation is performed, the data and/or program may be loaded into the working memory 5000.

The user interface 7000 may be implemented as various devices capable of receiving user input, such as a keyboard, a curtain key panel, a touch panel, a fingerprint sensor, a microphone, etc. The user interface 7000 may receive a user input and provide a signal corresponding to the received user input to the AP 4000. The wireless transceiver 8000 may include a modem 8100, a transceiver 8200, and an antenna 8300. For convenience of explanation, the ISP 2000 is included in the AP 4000, but is not limited thereto, and the ISP 2000 may be mounted as an IP separately from the AP 4000.

While the inventive concept has been particularly shown and described with reference to embodiments thereof, it will be understood that various changes in form and details may be made therein without departing from the spirit and scope of the following claims.

What is claimed is:

1. A device comprising:
   a first image sensor configured to generate a first signal corresponding to an image having a first resolution in a first mode, a second signal corresponding to an image having a second resolution higher than the first resolution in a second mode, and frame information regarding a resolution, wherein the first mode and the second mode respectively determined based on a mode signal;
   a channel allocator configured to allocate the first signal and the second signal to different channels, of a plurality of channels, based on the frame information; and
   an image signal processor (ISP) comprising the plurality of channels, a first channel of the plurality of channels configured to process the first signal and a second channel of the plurality of channels configured to process the second signal, and wherein the ISP is configured to post-process image data processed by the plurality of channels.

2. The device of claim 1, wherein the first channel is configured to process the image having the first resolution,
   the second channel is configured to process the image having the second resolution, and
   the channel allocator is further configured to provide the first signal to the first channel in the first mode and provide the second signal to the second channel in the second mode.

3. The device of claim 2, wherein the channel allocator comprises:
   a first multiplexer connected to the first channel and configured to receive the first signal and the second signal; and
   a second multiplexer connected to the second channel and configured to receive the first signal and the second signal.

4. The device of claim 3, further comprising a second image sensor,
   wherein the channel allocator further comprises a selector configured to generate a selection signal, and
   wherein the selection signal controls the first and second multiplexers to commonly receive a signal output from any one of the first and second image sensors.

5. The device of claim 1, wherein the first image sensor is configured to generate the frame information in the form of a virtual channel ID or embedded data.

6. The device of claim 5, wherein the virtual channel ID is based on a pre-determined channel standard.

7. The device of claim 6, wherein the channel allocator is further configured to receive the virtual channel ID and determine a resolution from the received virtual channel ID based on the pre-determined channel standard.

8. A device comprising:
an image sensor configured to generate a first signal corresponding to an image having a first resolution in a first mode, a second signal corresponding to an image having a second resolution higher than the first resolution in a second mode, and frame information regarding a resolution, wherein the first mode and the second mode respectively determined based on a mode signal;
a channel allocator configured to allocate the first signal and the second signal to different channels, of a plurality of channels, based on the frame information;
an image signal processor (ISP) comprising the plurality of channels, a first channel of the plurality of channels configured to process the first image and a second channel of the plurality of channels configured to process the second image, and configured to generate a third signal as a result of post-processing the first signal, and generate a fourth signal as a result of post-processing the second signal;
a memory subsystem comprising a first memory in which the third signal is temporarily stored and a second memory in which the fourth signal is temporarily stored;
a controller configured to generate the mode signal and apply the mode signal corresponding to the second mode to the image sensor in response to a capture command;
a display unit configured to load and display at least one of the third signal and the fourth signal for a user to preview the image having the first resolution; and
a capture unit configured to load the fourth signal based on the capture command to generate the image having the second resolution.

9. The device of claim 8, wherein, at a first time period, the controller is further configured to receive the capture command and issue, as the mode signal, a command to change a photographing mode of the image sensor from the first mode to the second mode based on the capture command,
at a second time period before a change to the second mode is completed and later than the first time period, the image sensor is further configured to generate the first signal, the channel allocator is further configured to allocate the generated first signal to the first channel, the ISP is further configured to generate the third signal and transmit the third signal to the first memory, and the display unit is further configured to load and display the third signal from the first memory,
at a third time period later than the second time period, the image sensor is further configured to complete the change to the second mode and generate the second signal, the channel allocator is further configured to allocate the generated second signal to the second channel, the ISP is further configured to generate the fourth signal and transmit the fourth signal to the second memory, and the capture unit is further configured to load the fourth signal from the second memory to generate the image of the second resolution, and lower the resolution of the fourth signal to store the fourth signal in the first memory, and
at a fourth time period after the second signal is generated by the image sensor and later than the third time period, the controller is further configured to issue, as the mode signal, a command to change the photographing mode from the second mode to the first mode.

10. The device of claim 8, wherein, at a first time period, the controller is further configured to issue, as the mode signal, a command to change a photographing mode of the image sensor from the first mode to the second mode,
at a second time period before a change to the second mode is completed and later than the first time period, the image sensor is further configured to generate the first signal, the channel allocator is further configured to allocate the generated first signal to the first channel, the ISP is further configured to generate the third signal and transmit the third signal to the first memory, and the display unit is further configured to load and display the third signal from the first memory,
at a third time period later than the second time period, the image sensor is changed to the second mode to generate the second signal, the channel allocator is further configured to allocate the generated second signal to the second channel, and the ISP is further configured to generate the fourth signal and transmit the fourth signal to the second memory,
at a fourth time period later than the third time period, the controller is further configured to receive the capture command, and the capture unit is further configured to load the fourth signal from the second memory to generate the image of the second resolution, and the first memory is further configured to store the fourth signal lowered,
at a fifth time period later than the fourth time period, the controller is further configured to issue, as the mode signal, a command to change the photographing mode back to the first mode,
at a sixth time period later than the fifth time period, the image sensor is further configured to complete the change to the first mode, and
the capture unit is further configured to continue to generate the image of the second resolution until the change to the first mode is completed.

11. The device of claim 8, wherein the first channel is configured to process the image having the first resolution,
the second channel is configured to process the image having the second resolution, and
the channel allocator is further configured to provide the first signal to the first channel in the first mode and provide the second signal to the second channel in the second mode.

12. The device of claim 11, wherein the channel allocator comprises:
a first multiplexer connected to the first channel and configured to receive the first signal and the second signal; and
a second multiplexer connected to the second channel and configured to receive the first signal and the second signal.

13. The device of claim 8, wherein the image sensor is configured to generate the frame information in the form of a virtual channel ID or embedded data.

14. The device of claim 13, wherein the virtual channel ID is based on a pre-determined channel standard.

15. The device of claim 14, wherein the channel allocator is further configured to receive the virtual channel ID and determine a resolution from the received virtual channel ID based on the pre-determined channel standard.

16. An image processing method comprising:
- generating a first signal corresponding to an image having a first resolution in a first mode;
- generating a second signal corresponding to an image having a second resolution higher than the first resolution in a second mode;
- generating frame information in the form of a virtual channel ID based on a predetermined channel standard; and
- determining a resolution of an image frame based on the frame information and allocating the first signal and the second signal to different channels based on the determined resolution.

17. The image processing method of claim 16, wherein the generating of the first signal and the second signal comprises:
- at a first time period, issuing a change command to change a photographing mode from the first mode to the second mode based on a capture command;
- at a second time period before a change to the second mode is completed and later than the first time period, generating the first signal; and
- at a third time period later than the second time period, based on the issued change command, completing the change of the photographing mode to the second mode and generating the second signal.

18. The image processing method of claim 17, wherein the allocating comprises:
- at the second time period, allocating the generated first signal to a first channel;
- at the third time period, allocating the generated second signal to a second channel; and
- at a fourth time period immediately after generating the second signal and later than the third time period, changing the photographing mode back to the first mode.

19. The image processing method of claim 16, wherein the generating of the first signal and the second signal further comprises:
- at a first time period, issuing a first change command to change a photographing mode to the second mode;
- at a second time period still before a change to the second mode is completed and later than the first time period, generating the first signal; and
- at a third time period later than the second time period, based on the issued first change command, completing the change of the photographing mode to the second mode and generating the second signal.

20. The image processing method of claim 19, wherein the allocating comprises:
- at the second time period, allocating the generated first signal to a first channel;
- at the third time period, allocating the generated second signal to a second channel;
- at a fourth time period later than the third time period, receiving a capture command and generating the image of the second resolution;
- continuously generating the image of the second resolution until the photographing mode is changed to the first mode;
- at a fifth time period later than the fourth time period, issuing a second change command to change the photographing mode back to the first mode; and
- at a sixth time period later than the fifth time period, completing the change of the photographing mode to the first mode based on the issued second change command.

* * * * *